United States Patent
Lee et al.

(10) Patent No.: US 10,225,790 B2
(45) Date of Patent: Mar. 5, 2019

(54) METHOD AND APPARATUS FOR DISCOVERING WLAN

(71) Applicant: Samsung Electronics Co., Ltd., Suwon-si, Gyeonggi-do (KR)

(72) Inventors: Jinsung Lee, Suwon-si (KR); Hakyung Jung, Seoul (KR); Jungshin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/900,898

(22) PCT Filed: Jul. 31, 2014

(86) PCT No.: PCT/KR2014/007074
§ 371 (c)(1),
(2) Date: Dec. 22, 2015

(87) PCT Pub. No.: WO2015/016645
PCT Pub. Date: Feb. 5, 2015

(65) Prior Publication Data
US 2016/0157163 A1    Jun. 2, 2016

(30) Foreign Application Priority Data

Jul. 31, 2013  (KR) .................. 10-2013-0090800

(51) Int. Cl.
*H04W 48/16* (2009.01)
*H04W 48/08* (2009.01)
(Continued)

(52) U.S. Cl.
CPC ........... *H04W 48/16* (2013.01); *H04L 5/0053* (2013.01); *H04W 48/08* (2013.01); *H04W 48/20* (2013.01);
(Continued)

(58) Field of Classification Search
CPC . H04W 48/16; H04W 56/00; H04W 72/0446; H04W 48/20; H04W 48/08; H04W 84/12; H04L 5/0053
See application file for complete search history.

(56) References Cited

U.S. PATENT DOCUMENTS 8,165,594 B2   4/2012 Wang et al.
2005/0068928 A1   3/2005 Smith et al.
(Continued)

FOREIGN PATENT DOCUMENTS

CN   1860806 A   11/2006
CN   101006683 A   7/2007
(Continued)

OTHER PUBLICATIONS

Chinese Office Action dated Aug. 1, 2018 issued in Chinese Application No. 2014800427626.

*Primary Examiner* — Thai Nguyen
(74) *Attorney, Agent, or Firm* — Jefferson IP Law, LLP

(57) ABSTRACT

Disclosed are a signal transmitting method by a BS and a discovery method by a terminal to perform a WLAN discovery. The signal transmitting method by the BS includes: collecting information including beacon transmission periods and beacon transmission time of one or more WLAN Access Points (APs) within a cell range of the BS; generating grouping information in which beacon transmission time of the WLAN APs is mapped to a time area divided according to a grouping level from a reference time by using the collected information; and transmitting the grouping information to one or more reception terminals within cell range of the BS. Further, the discovery method by the terminal includes: receiving grouping information in which beacon transmission time of one or more WLAN Access Points (APs) is mapped to a time area divided according to a grouping level from a reference time; and discovering a (Continued)

WLAN AP only during a time to which the beacon transmission time is mapped according to the grouping information. Accordingly, the terminal can energy-efficiently discover a WLAN.

22 Claims, 10 Drawing Sheets

(51) Int. Cl.
    *H04L 5/00*       (2006.01)
    *H04W 48/20*     (2009.01)
    *H04W 56/00*     (2009.01)
    *H04W 72/04*     (2009.01)
    *H04W 84/12*     (2009.01)

(52) U.S. Cl.
    CPC ....... *H04W 56/00* (2013.01); *H04W 72/0446* (2013.01); *H04W 84/12* (2013.01)

(56) References Cited

U.S. PATENT DOCUMENTS

| | | |
|---|---|---|
| 2006/0034236 A1 | 2/2006 | Jeong et al. |
| 2006/0040656 A1 | 2/2006 | Kotzin |
| 2006/0268756 A1* | 11/2006 | Wang .................... H04W 36/32 370/310 |
| 2008/0090583 A1 | 4/2008 | Wang et al. |
| 2011/0222523 A1 | 9/2011 | Fu et al. |
| 2012/0176993 A1 | 7/2012 | Wang et al. |
| 2013/0136097 A1 | 5/2013 | Yu et al. |
| 2013/0159458 A1 | 6/2013 | Yu et al. |
| 2013/0188621 A1 | 7/2013 | Meylan et al. |
| 2013/0279438 A1* | 10/2013 | Kwon ............... H04W 72/0406 370/329 |
| 2014/0256317 A1 | 9/2014 | Zhao et al. |

FOREIGN PATENT DOCUMENTS

| | | |
|---|---|---|
| CN | 101622826 A | 1/2010 |
| CN | 102421166 A | 4/2012 |
| WO | 2007-078173 A1 | 7/2007 |

* cited by examiner

[Fig. 1]
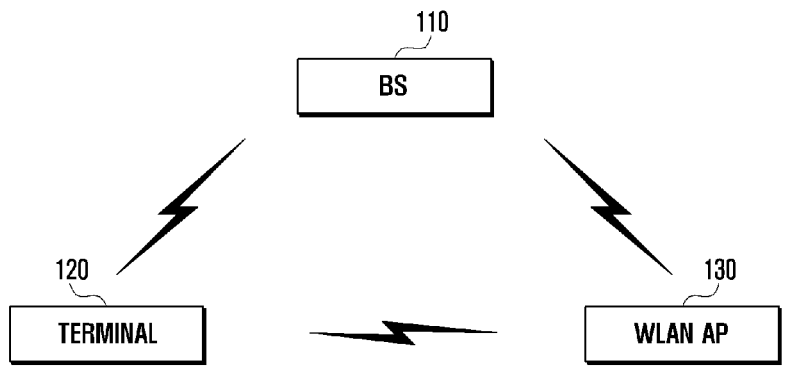
[Fig. 2]
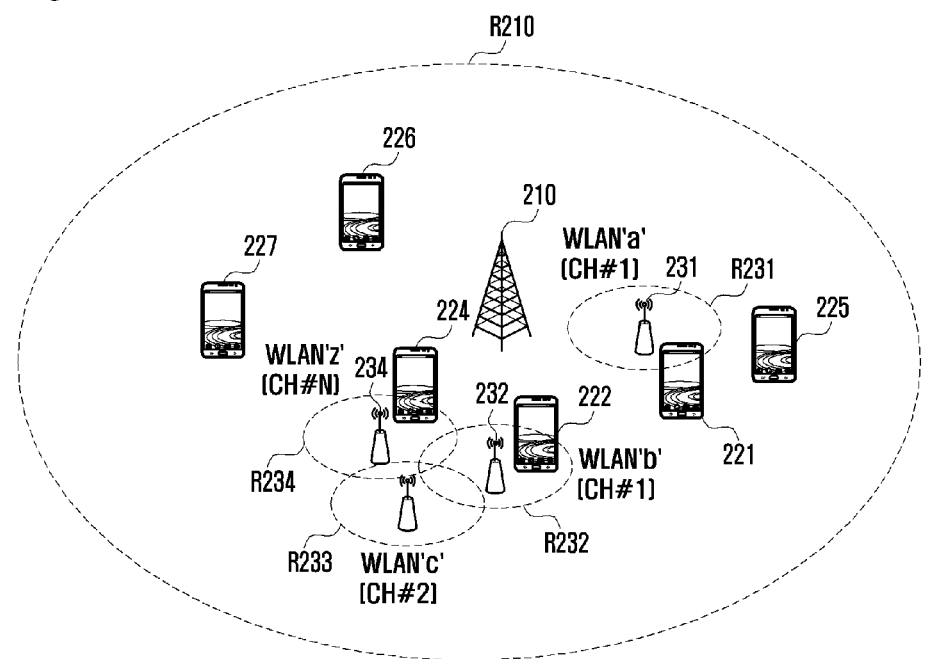

[Fig. 3]
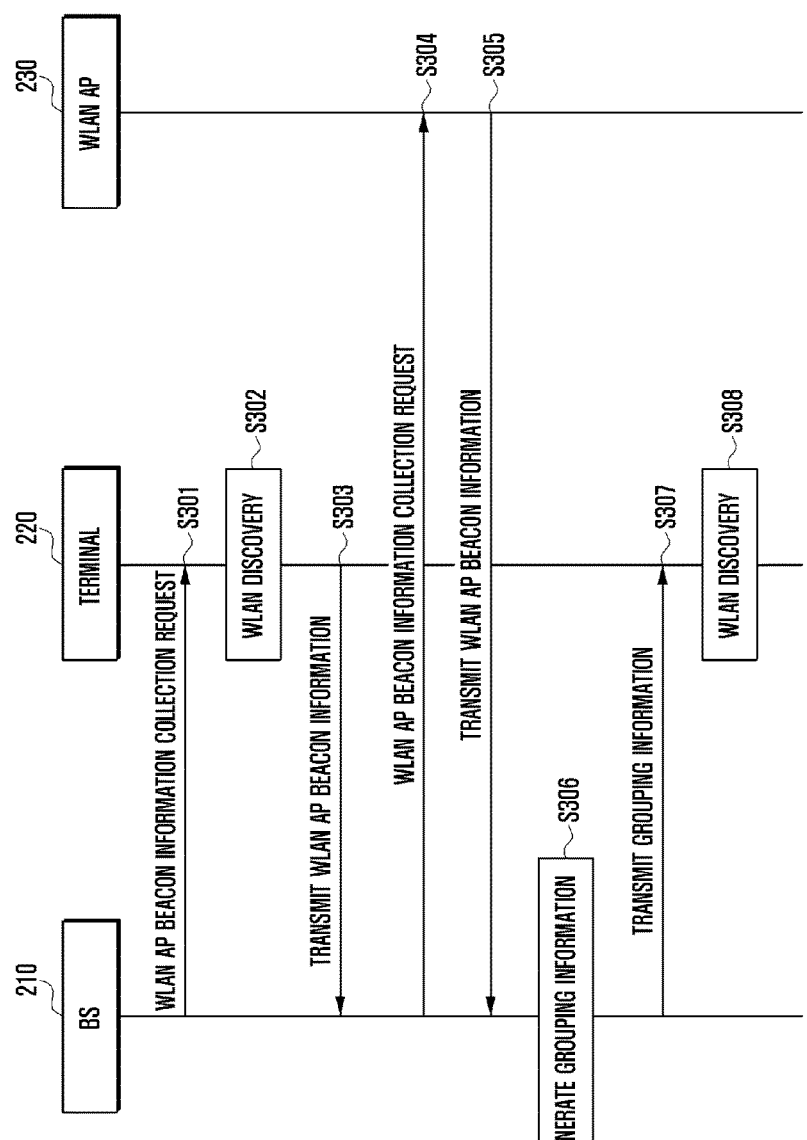
[Fig. 4]
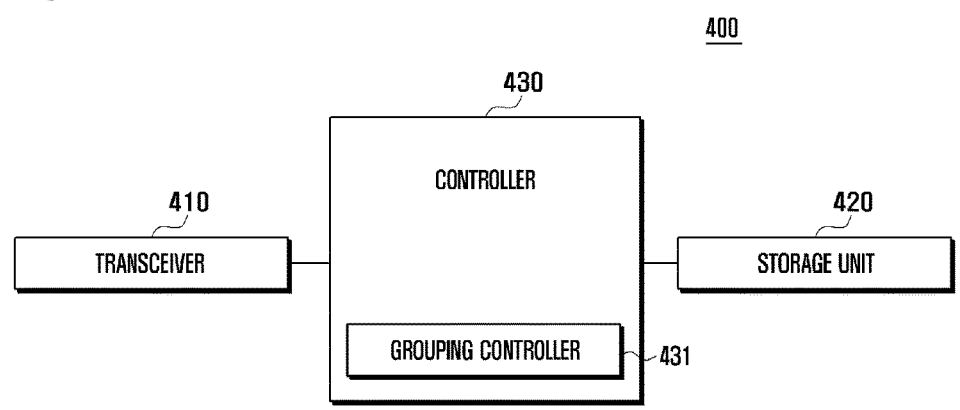

[Fig. 5]
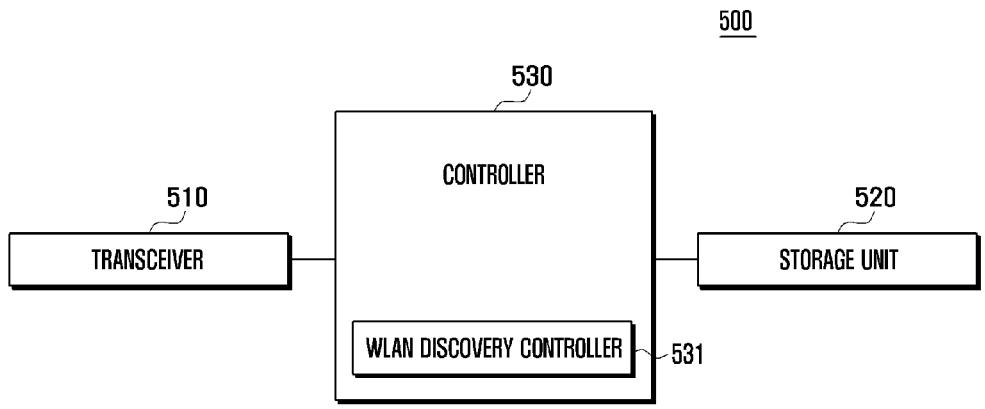
[Fig. 6]
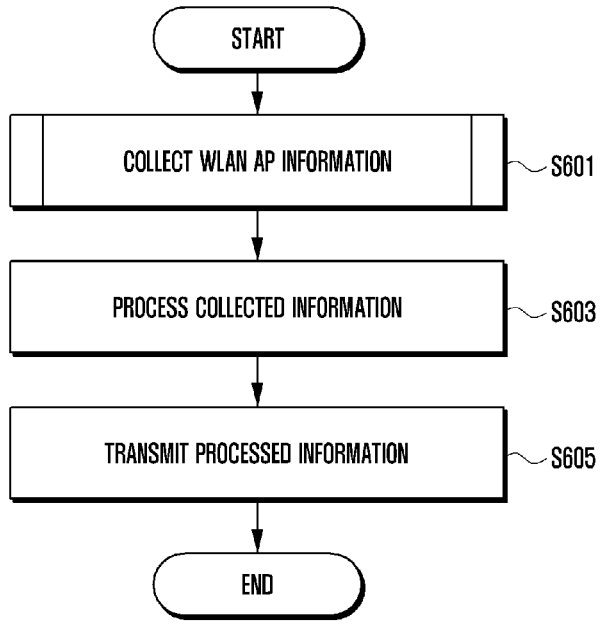
[Fig. 7]
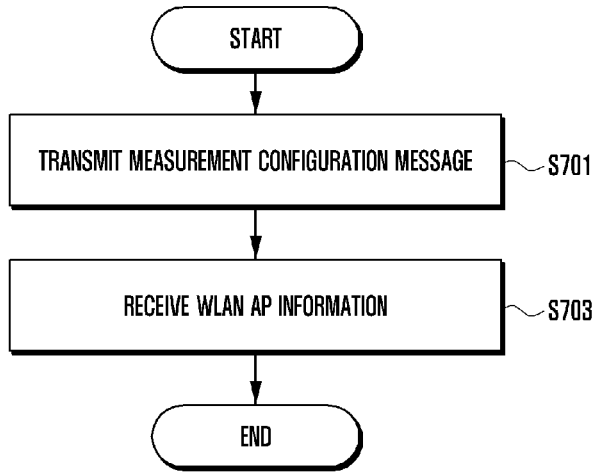

[Fig. 8]
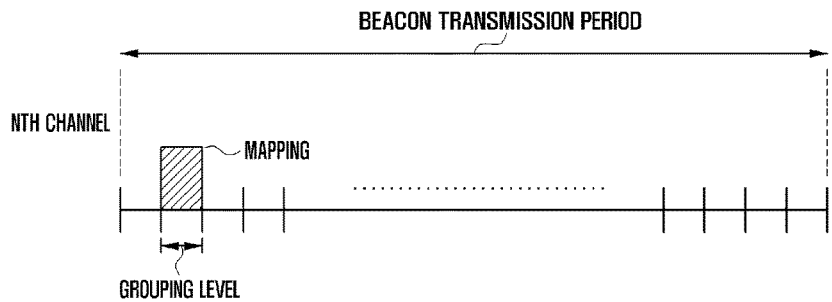
[Fig. 9]
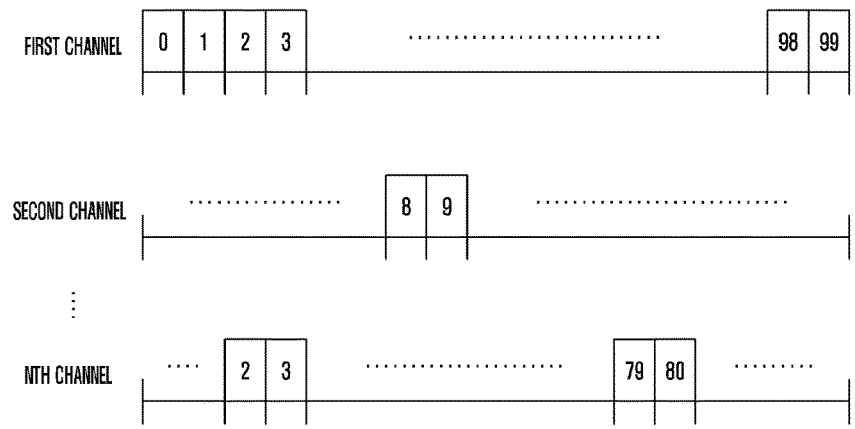
[Fig. 10a]
12:00:00 (REFERENCE TIME)
100ms (BEACON TRANSMISSION PERIOD)
1ms (GROUPING LEVEL)
FIRST CHANNEL : 0, 1, 2, 3, 98, 99
SECOND CHANNEL : 8, 9
NTH CHANNEL : 2, 3, 79, 80
[Fig. 10b]
100ms (BEACON TRANSMISSION PERIOD)
1ms (GROUPING LEVEL)
FIRST CHANNEL : 12:00:0.000-3, 98-99
SECOND CHANNEL : 12:00:0.008-9
NTH CHANNEL : 12:00:0.002-3, 79-80

[Fig. 10c]

> 12:00:00 (REFERENCE TIME)
> 100ms (BEACON TRANSMISSION PERIOD)
> FIRST CHANNEL : 0-3ms, 98-99ms
> SECOND CHANNEL : 8-9ms
> NTH CHANNEL : 2-3ms, 79-80ms

[Fig. 10d]

> 12:00:00 (REFERENCE TIME)
> 100ms (BEACON TRANSMISSION PERIOD)
> 1ms (GROUPING LEVEL)
> Off period
> FIRST CHANNEL : 4-97
> SECOND CHANNEL : 0-7, 10-99
> NTH CHANNEL : 0-1, 4-78, 81-99

[Fig. 10e]

> 12:00:00 (REFERENCE TIME)
> 100ms (BEACON TRANSMISSION PERIOD)
> Off period
> FIRST CHANNEL : 4-97ms
> SECOND CHANNEL : 0-7ms, 10-99ms
> NTH CHANNEL : 0-1ms, 4-78ms, 81-99ms

[Fig. 11]
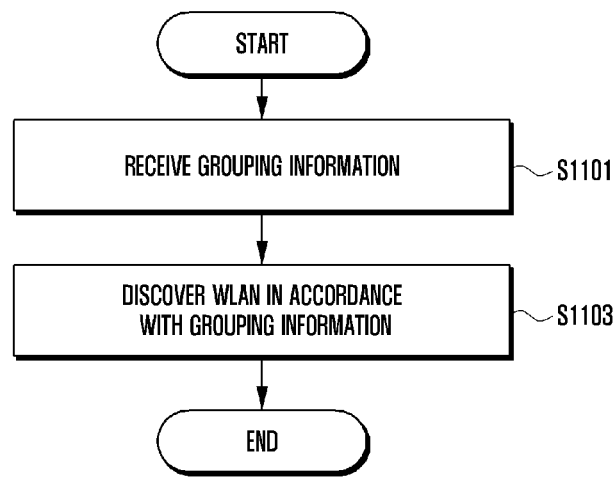
[Fig. 12]
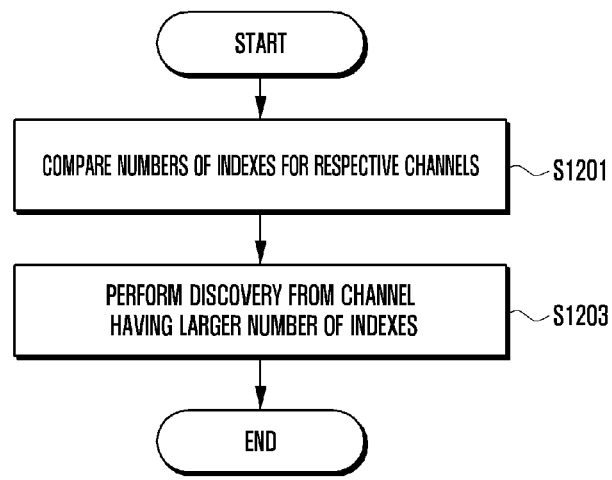

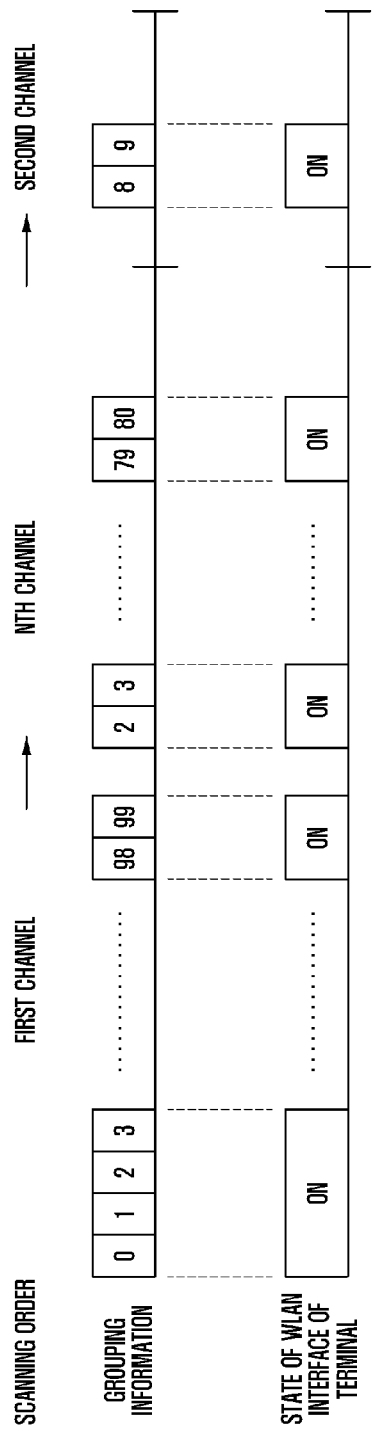
[Fig. 13]

[Fig. 14]
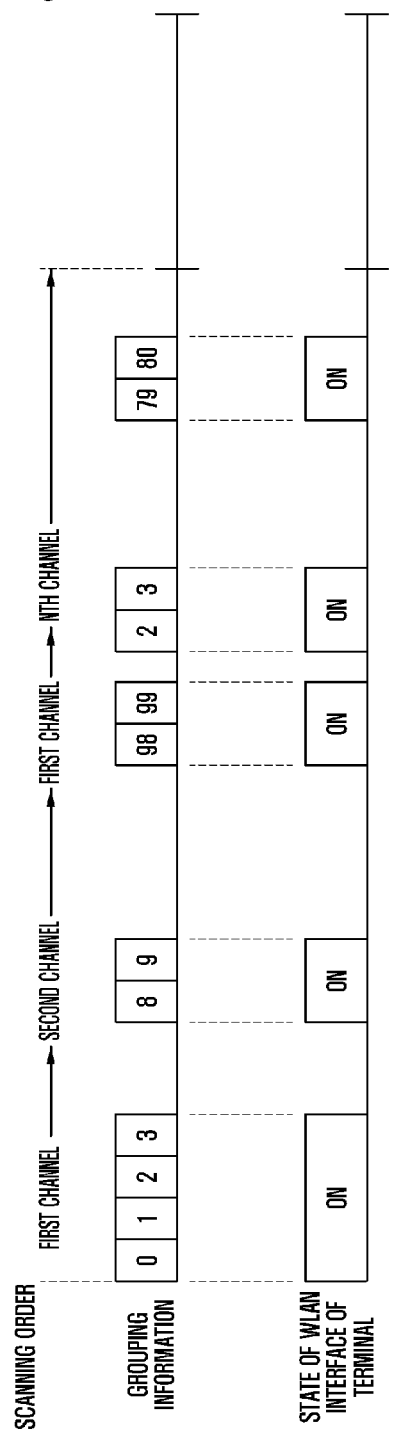

[Fig. 15]
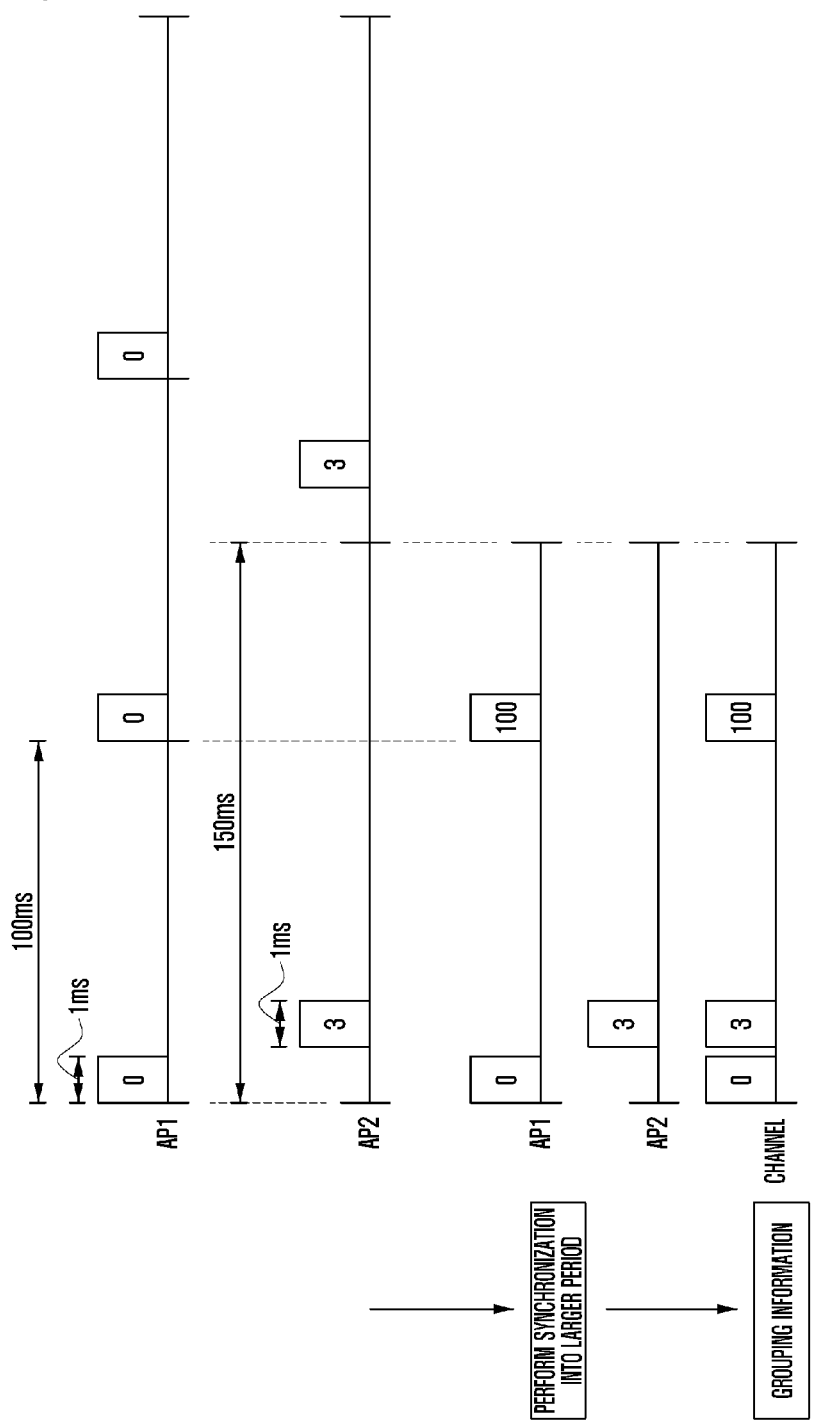

[Fig. 16]
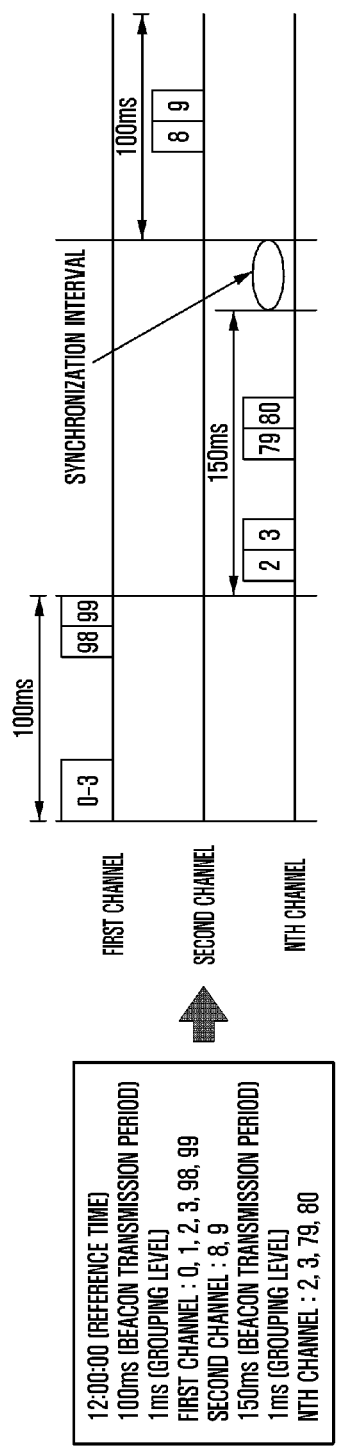

METHOD AND APPARATUS FOR DISCOVERING WLAN

TECHNICAL FIELD

The present invention relates generally to a method and an apparatus for discovering a WLAN, and more particular to an energy-efficient WLAN discovering method.

BACKGROUND ART

A process of discovering a Wireless Local Area Network (WLAN) Access Point (AP) should be preprocessed to allow a terminal to use a WLAN service. A method of discovering a WLAN AP may be divided into two methods including a passive scanning method and an active scanning method. In the passive scanning method, a terminal receives a beacon frame periodically transmitted (100 ms) by a WLAN AP to identify the existence of the WLAN AP. The passive scanning method may require a maximum time of 100 ms per channel according to a time point when the beacon is obtained. In the active scanning method, when the terminal directly transmits a probe request and the WLAN AP receives the probe request, the WLAN AP transmits a probe response to inform of the existence of itself. The active scanning method takes less time to discover the WLAN AP in every channel as compared to the passive scanning method, but has a burden in that the UE should transmit the probe request. Further, there is another burden in that the WLAN AP should generate a packet in addition to the beacon frame. Accordingly, the prior art (US 20060040656) discloses a method in which a cellular Base Station (BS) is synchronized with a WLAN terminal and the cellular BS informs the terminal of a transmission time of the synchronized WLAN AP, so that the terminal turns on its own WLAN interface according to a beacon receiving time.

Such a prior art requires an interface or a hardware device to synchronize the cellular BS and the WLAN AP. Accordingly, it is difficult to synchronize a WLAN AP which a user has personally installed. Further, there are many WLAN APs within a service coverage of the cellular BS, and thus it is difficult to synchronize the many WLAN APs and the terminal is burdened by many pieces of information provided to the terminal.

Accordingly, an improved WLAN discovering method is currently required.

DISCLOSURE OF INVENTION

Technical Problem

A technical solution to achieve the present invention provides a method and an apparatus for energy-efficiently discovering a WLAN.

In order to solve the above problems, embodiments of the present invention provide a method and an apparatus for energy-efficiently discovering a WLAN with assistance from a cellular network with respect to a dual mode terminal simultaneously supporting both the cellular network and a WLAN network.

The present invention minimizes an AP discovery time, and groups and provides information on beacons of WLAN APs to reduce data burden of the terminal.

Embodiments of the present invention provide a method of discovering a WLAN AP by providing beacon frame information of a WLAN AP to the terminal without using a separate interface for synchronization between a cellular BS and a WLAN AP.

Solution to Problem

In accordance with an aspect of the present invention, a method of transmitting a signal to perform a Wireless Local Area Network (WLAN) discovery by a Base Station (BS) is provided. The method includes: collecting information including beacon transmission periods and beacon transmission time of one or more WLAN Access Points (APs) within a cell range of the BS; generating grouping information in which beacon transmission time of the WLAN APs is mapped to a time area divided according to a grouping level from a reference time by using the collected information; and transmitting the grouping information to one or more reception terminals within the cell range of the BS.

In accordance with another aspect of the present invention, a Base Station (BS) providing Wireless Local Area Network (WLAN) discovery information is provided. The BS includes: a transceiver for communicating with a terminal and a WLAN Access Point (AP); and a grouping controller for collecting information including beacon transmission periods and beacon transmission time of one or more WLAN Access Points (APs) within a cell range of the BS, generating grouping information in which beacon transmission time of the WLAN APs is mapped to a time area divided according to a grouping level from a reference time by using the collected information, and transmitting the grouping information to one or more reception terminals within the cell range of the BS.

In accordance with another aspect of the present invention, a method of discovering a Wireless Local Area Network (WLAN) by a terminal is provided. The method includes: receiving grouping information in which beacon transmission time of one or more WLAN Access Points (APs) is mapped to a time area divided according to a grouping level from a reference time; and discovering a WLAN AP only during a time to which the beacon transmission time is mapped according to the grouping information.

In accordance with another aspect of the present invention, a terminal discovering a Wireless Local Area Network (WLAN) is provided. The terminal includes: a transceiver for communicating with a Base Station (BS) and a WLAN Access Point (AP); and a WLAN discovery controller for making a control to receive grouping information in which beacon transmission time of one or more WLAN APs is mapped to a time area divided according to a grouping level from a reference time and discover a WLAN AP only during a time to which the beacon transmission time is mapped.

Advantageous Effects of Invention

Embodiments of the present invention provide an improved WLAN AP discovering method.

Embodiments of the present invention provide an energy-efficient WLAN AP discovering method. To this end, embodiments of the present invention minimize a WLAN AP discovery time and groups data to be transmitted to the terminal to provide minimized data.

Embodiments of the present invention provide a method of discovering a WLAN AP by providing beacon frame information of a WLAN AP to the terminal without using a separate interface for synchronization between a cellular BS and a WLAN AP.

BRIEF DESCRIPTION OF DRAWINGS

FIG. 1 is a block diagram illustrating a WLAN discovering system according to an embodiment of the present invention;

FIG. 2 is a view describing a WLAN discovering system according to an embodiment of the present invention;

FIG. 3 is a flowchart illustrating a method of discovering a WLAN in a WLAN discovering system according to an embodiment of the present invention;

FIG. 4 is a block diagram illustrating a BS device according to an embodiment of the present invention;

FIG. 5 is a block diagram illustrating a terminal according to an embodiment of the present invention;

FIG. 6 is a flowchart illustrating a method of providing WLAN discovery information by a BS according to an embodiment of the present invention;

FIG. 7 is a flowchart illustrating a method of transmitting a message by a BS and a terminal in the embodiment of FIG. 6;

FIG. 8 is a view describing a step of processing information collection of FIG. 6;

FIG. 9 is a view describing the step of processing the information collection of FIG. 6;

FIG. 10 is a view describing grouping index information of FIG. 9;

FIG. 11 is a flowchart illustrating a method of discovering a WLAN by a terminal according to an embodiment of the present invention;

FIG. 12 is a flowchart illustrating a discovery method for each channel according to an embodiment of the present invention;

FIG. 13 is a view describing the methods of FIGS. 11 and 12;

FIG. 14 is a view describing a discovery method of discovering a WLAN when a channel is changed according to an embodiment of the present invention;

FIG. 15 is a view describing a method of generating grouping information when beacon transmission periods are different according to an embodiment of the present invention; and FIG. 16 is a view describing synchronization between channels having different beacon transmission periods.

MODE FOR THE INVENTION

Hereinafter, an embodiment of the present invention will be described in more detail with reference to the accompanying drawings to allow those skilled in the art to easily implement the present invention. However, the present invention may be implemented in various different forms and is not limited to embodiments described herein. Further, parts irrelevant to the present invention are omitted in the drawings to make the present invention clear and the same reference numerals are designated to the same or similar components throughout the specification.

Embodiments of the present invention may be applied to a terminal that discovers a WLAN AP and a BS that supports a WLAN AP discovery.

The terminal mentioned in embodiments of the present invention is an electronic device and may be a dual mode terminal which can support communication with both a cellular BS and a WLAN AP. The terminal is an electronic device and may include not only general electronic terminals such as a smart phone, a portable terminal, a mobile terminal, a Personal Digital Assistant (PDA), a Portable Multimedia Player (PMP), a note pad, a Wibro terminal, a tablet Personal Computer (PC), a computer, and a multimedia device, but also all terminals supporting communication with a WLAN AP and a cellular BS.

Hereinafter, embodiments of the present invention will be described in more detail with reference to the accompanying drawings.

FIG. 1 is a block diagram illustrating a WLAN discovering system according to an embodiment of the present invention.

Referring to FIG. 1, the WLAN discovering system may include a BS 110, a terminal 120, and a WLAN AP 130. In FIG. 1, although each of the devices is illustrated as one block to schematically describe a system structure, the BS 110, the terminal 120, and the WLAN AP 130 may be plural.

In an embodiment of the present invention, the BS 110 provides a method and an apparatus for energy-efficiently discovering the WLAN AP 130 with assistance from a cellular network with respect to the dual mode terminal 120 which simultaneously supports a cellular network and a wireless network.

Subsequently, a method of operating the WLAN discovering system according to an embodiment of the present invention will be described with reference to FIGS. 2 and 3.

FIG. 2 is a view describing a WLAN discovering system according to an embodiment of the present invention and FIG. 3 is a flowchart illustrating a method of discovering a WLAN in the WLAN discovering system according to an embodiment of the present invention.

Referring to FIG. 2, the WLAN discovering system may include a BS 210, terminals 220 (221, 222, 223, 224, 225, and 226), and 227, and APs 230 (231, 232, 233, and 234). A plurality of terminals 220 and WLAN APs 230 may be included within a cell range R210 of the BS.

The WLAN APs 230 have corresponding WLAN ranges R231, R232, R233, and R234, respectively, and the terminals 220 may be located in the WLAN ranges R231, R232, R233, and R234.

In FIG. 2, the first terminal 221 is located within the WLAN range R231 of the first WLAN AP 231, the second terminal 222 is included within the WLAN range R232 of the second WLAN AP 232, the third terminal 223 is included within the WLAN range R233 of the third WLAN AP 233, and the fourth terminal 224 is included within the WLAN range R234 of the fourth WLAN AP 234. Channels of the WLAN APs 230 may be the same as or different from each other. For example, channels of the first WLAN AP 231 and the second WLAN AP 232 may be the same and channels of the third WLAN AP 233 and the fourth WLAN AP 234 may be different.

In an embodiment of the present invention, the BS 210 may transmit/receive data to/from the terminals 220 and the WLAN APs 230. The BS 210 may receive beacon information on one or more WLAN APs 230 within its own cell range from the one or more terminals 220 or WLAN APs 230.

A method of receiving the beacon information may be largely divided into two methods. In FIG. 3, steps S301, S302, and S303 correspond to flows of a process in which the BS 210 collects beacon information from the terminals 220. Further, steps S304 and S305 correspond to flows of a process in which the BS 210 directly collects beacon information from the WLAN APs 230.

In step S301, the BS 210 may transmit a WLAN AP beacon information collection request message to the terminal 220s. For example, in FIG. 2, the BS 210 may transmit the beacon information collection request message to the first terminal 221. The first terminal 221 having received the message may turn on a WLAN interface to collect beacon information from adjacent WLAN APs 230. In FIG. 2, the first terminal 221 may collect beacon information of the first WLAN AP 231. In FIG. 2, since the first terminal 221 is within one cell range R231 of the first WLAN AP 231, the first terminal 221 collects information of the first WLAN AP 231. Accordingly, if the first terminal 221 is included within a cell range of another WLAN AP, the first terminal 221 may also collect beacon information of the WLAN AP.

The beacon information may be a beacon frame. The beacon frame may include information on a beacon transmission period and a beacon transmission time of each of the WLAN APs 230. When the beacon frame does not include the beacon transmission time, a time when the terminal receives the beacon frame may be included instead of the beacon transmission time. Further, the beacon frame further includes CHannel (CH) information and Service Set IDentifier (ID) information of the WLAN APs 230 and the terminals 220 may transmit the information to the BS 210.

The BS 210 may directly collect the beacon information from the WLAN APs 230. In step S304, the BS 210 may transmit a beacon information collection request message to the WLAN APs 230 connected to the network within the cell range. The WLAN APs 230 having received the message may transmit their own beacon information in step S305. Further, the WLAN APs 230 may also transmit their own channel information and SSID information.

As described above, the BS may collect the information of the WLAN APs from the terminal and also directly collect the information of the WLAN APs from the WLAN APs. When the BS collects the information of the WLAN APs from the terminal, the BS may collect information of all the WLAN APs measured by the terminal, but the terminal may consume energy to measure and collect the information. In contrast, when the BS directly collects the information from the WLAN APs, the WLAN APs do not additionally consume energy to collect the information, but it may be difficult to collect information of the WLAN AP which is not connected to the BS through the network.

The BS may collect the beacon information though the method described in steps S301 to S305.

The BS 210 having collected the beacon information may process the collected beacon information in step S306. The BS 210 may group and map the WLAN APs 230 having the same beacon transmission time from a reference time and generate grouping information.

In step S307, the BS 210 may transmit the generated grouping information to one or more terminals 220 within the cell range of the BS 210. Since the BS 210 groups the beacon information and transmits the grouped beacon information, it is possible to reduce burdens of the terminals 220 receiving the beacon information.

In step S308, the terminals 220 having received the grouping information from the BS 220 may reduce power consumption by performing the WLAN discovery only during the time when the WLAN APs 230 transmit the beacon. For example, the terminals 220 may discover neighboring WLANs by turning on a WLAN interface during the time when the WLAN APs 230 transmit the beacon, and may effectively discover neighboring WLANs by turning off the WLAN interface during the time when the WLAN APs 230 do not transmit the beacon.

FIG. 4 is a block diagram illustrating a BS device according to an embodiment of the present invention.

Referring to FIG. 4, a BS 400 may include a transceiver 410, a storage unit 420, and a controller 430.

The transceiver 410 may perform data communication with another BS, a terminal, and a WLAN AP over a mobile communication network. Particularly, in an embodiment of the present invention, the transceiver 410 may transmit a beacon information request message of the WLAN AP and receive beacon information corresponding to the transmitted message according to a control of the controller 430. Further, the transceiver 410 may transmit grouping information to the terminal.

The storage unit 420 may store a program or commands for operating the BS 400. The controller 430 may control the BS to operate by using the program or commands stored in the storage unit 420. Particularly, in an embodiment of the present invention, the storage unit 420 may store beacon information collected from the terminals or the WLAN APs and store grouping information processed from the collected beacon information.

The controller 430 may control general operations of the BS. Particularly, in an embodiment of the present invention, the controller 430 may further include a grouping controller 431.

According to an embodiment of the present invention, the grouping controller 431 may make a control to collect information including a beacon transmission period and a beacon transmission time of one or more WLAN APs within cell range of the BS, generate grouping information in which the beacon transmission time of each WLAN AP is mapped to a time area divided according to a grouping level from a reference time, and transmit the grouping information to one or more terminals within the cell range of the BS.

Further, the grouping controller 431 may make a control to transmit a message instructing the one or more terminals to measure the beacon transmission period and the beacon transmission time of the WLAN APs and receive information on the measured beacon transmission period and beacon transmission time from the terminals.

The grouping controller 431 may make a control to directly collect information on the beacon transmission period and the beacon transmission time from the WLAN APs connected to the BS wirelessly or through a wire.

The grouping controller 431 may make a control to map the beacon transmission time to the groups divided according to the grouping level in accordance with channel information of each of WLAN APs.

The grouping controller 431 may make a control to map the beacon transmission time in accordance with the same channel information and the same beacon transmission period of the WLAN APs, and map a dummy area for synchronization when the beacon transmission periods are different.

Meanwhile, although the controller 430 and the grouping controller 431 are implemented as separated blocks and the function performed by each of the blocks has been described, it is only for convenience of the technology and the functions do not have to be separated. For example, it is noted that a particular function performed by the grouping controller 431 may be performed by the controller 430.

Further, although the transceiver 410, the storage unit 420, and the controller 430 have been described as separated components, it is also only for convenience of the technology and the functions do not have to be separated. Accordingly, it may be changed and applied according to a level of those skilled in the art.

FIG. 5 is a block diagram illustrating a terminal according to an embodiment of the present invention.

Referring to FIG. 5, a terminal 500 may include a transceiver 510, a storage unit 520, and a controller 530.

The transceiver 510 may include one or more modules enabling wireless communication. Specifically, the transceiver 510 may transmit/receive a wireless signal to/from a BS, another terminal, and a WLAN AP. The wireless signal may include a voice call signal, a video call signal, or various types of data according to text/multimedia message transmission/reception. Further, the transceiver 510 may exchange data by using communication technologies such as Wireless Local Area Network (WLAN), Wi-Fi, Wireless broadband (Wibro), World Interoperability for Microwave Access (Wimax), High Speed Downlink Packet Access (HSDPA) and the like.

Particularly, in an embodiment of the present invention, the transceiver 510 may receive a WLAN AP beacon information collection request message from the BS and transmit collected information to the BS in response to the received message. Further, the transceiver 510 may collect grouping information from the BS and discover WLAN APs by using the grouping information.

The storage unit 520 may store a program or commands for operating the terminal 500. The controller 530 may make a control to perform the operation of the BS by using the program or commands stored in the storage unit 520. Particularly, in an embodiment of the present invention, the storage unit 520 may store beacon information of the WLAN AP. Further, the storage unit 520 may store grouping information received from the BS.

The controller 530 may control general operations of the terminal 500. Particularly, in an embodiment of the present invention, the controller 530 may further include a WLAN discovery controller 531.

In an embodiment of the present invention, the WLAN discovery controller 531 may make a control to receive grouping information in which a beacon transmission time of one or more WLAN APs is mapped to the time area divided according to a grouping level from a reference time and discover the WPAN AP only at the time when the beacon transmission time is mapped in accordance with the grouping information.

Further, the WLAN discovery controller 531 may make a control to discover a WLAN of a particular channel at the time when a particular channel beacon transmission time is mapped, switch a discovery channel in accordance with beacon transmission time mapping information of another channel at the time when the beacon transmission time of the particular channel is not mapped, and discover a WLAN of the switched channel.

When the received grouping information includes information on different beacon transmission periods, the WLAN discovery controller 531 may make a control to not perform the WLAN discovery in the dummy area for the synchronization of the beacon transmission periods.

The WLAN discovery controller 531 may make a control to receive a message instructing to measure beacon transmission information of one or more WLAN APs from the BS and transmit the beacon transmission information of the WLAN AP within a WLAN interface range to the BS in response to the received message.

Meanwhile, although the controller 530 and the WLAN discovery controller 531 are implemented as separated blocks and the function performed by each of the blocks has been described, it is only for convenience of the technology and the functions do not have to be separated. For example, it is noted that a particular function performed by the WLAN discovery controller 531 may be performed by the controller 530.

Further, although the transceiver 510, the storage unit 520, and the controller 530 have been described as separated components, it is also only for convenience of the technology and the functions do not have to be separated. Accordingly, it may be changed and applied according to a level of those skilled in the art.

Subsequently, a method of providing WLAN discovery information by the BS according to an embodiment of the present invention will be described with reference to FIGS. 6 to 10.

FIG. 6 is a flowchart illustrating a method of providing WLAN discovery information by the BS according to an embodiment of the present invention.

Referring to FIG. 6, the BS may collect information of WLAN APs in step S601. The information of the WLAN APs may include beacon information, channel information, and service identifier information. The beacon information may include information on a beacon transmission time and a beacon transmission period. In an embodiment, the beacon information may be collected through the reception of a beacon frame. Since the information of the WLAN AP is static information, an update period may be relatively very large. Further, the BS and the terminal will have little overhead due to the collection of the WLAN AP information.

A method of collecting information of the WLAN AP by the BS may be largely classified into two methods. In an embodiment, the BS may directly collect information of the WLAN AP from the WLAN AP. In this case, information may be transmitted/received through a wired interface or a wireless interface of the BS and the WLAN AP.

In another embodiment, the BS may collect information of the WLAN AP from the terminal within the cell range of the BS. The BS may transmit a message making a request for collecting information of the WLAN AP to the terminal within the cell range of the BS. The terminal having received the information collection request message may collect the information of the WLAN AP connected to the terminal through the WLAN interface. The information of the WLAN AP may be the same as that described in the above. The terminal may collect information on a beacon transmission time and a beacon transmission period of the WLAN AP by receiving a beacon frame from the WLAN AP. The terminal may report the collected information of the WLAN AP to the BS. The collection of the information of the WLAN AP using the terminal will be described in more detail with reference to FIG. 7.

In step S603, the BS may process the information of the WLAN AP collected in the previous step. When the BS transmits the information of the WLAN AP collected from the terminal or the WLAN AP to the terminal without processing the information, the terminal may have a data burden. Accordingly, the BS may group the collected information to generate processed information in step S603. According to an embodiment, in a method of generating processed information, the BS groups the collected beacon information based on the transmission time of WLAN APs having the same beacon transmission time from a reference time. It will be described below in more detail.

In step S605, the BS may transmit the processed information to one or more terminals within the cell rage of the BS. The BS may transmit the processed information through largely two methods. In an embodiment, there is a broadcast method. In this case, all terminals within the cell rage may simultaneously receive the processed information. The BS may also broadcast system information such as an SIB. In another embodiment, the processed information may be transmitted to a particular terminal through a unicast method. When there is a request for information of the WALN AP by the terminal, the BS may transmit the processed information to the terminal having made the request. Further, when the terminal makes an initial attach (for example, when the terminal turns on power) or performs a handover, the BS may transmit the processed information of the WLAN AP.

FIG. 7 is a flowchart illustrating a method of transmitting a message by the BS and the terminal in the embodiment of FIG. 6.

Referring to FIG. 7, in step S701, the BS may transmit a message for instructing one or more terminals within the cell range of the BS to measure and report information of the WLAN AP. Based on an LTE system, the BS transmits a measurement configuration of the WLAN AP to the terminal. Since the measurement can be made only for e-UTRA, UTRAN, GERAN, and CDMA2000 cells in a current LTE system, it may be required to change the LTE standard to measure the information of the WLAN AP. Through the change in the LTE standard, a WLAN AP discovery option may be added. Terminals having received the measurement configuration of the WLAN AP through a change in the 3GPP standard may turn on their own WLAN interface to discover adjacent WLAN APs. When there are adjacent WLAN APs and thus the terminal receives beacon frames from the WLAN APs, the terminal may recognize and store channels, service identifiers, and beacon transmission information of the corresponding WLAN APs. The beacon frame may include information on a beacon transmission period and a beacon transmission time. The terminal may transmit the collected information.

In step S703, the BS may receive the collected information of the WLAN AP which the terminal measured according to the measurement configuration. The information of the WLAN AP collected by the terminal may be transmitted to a current serving BS through uplink transmission. In the LTE system, the terminal may transmit the collected information of the WLAN AP to the serving BS by using a measurement report.

Subsequently, the information processing step of FIG. 6 will be described with reference to FIGS. 8 to 10. FIGS. 8 and 9 are views describing the information collection processing step of FIG. 6, and FIG. 10 is a view describing grouping index information of FIG. 9.

Referring to FIG. 8, the grouping information includes channel information, beacon transmission period information, grouping level information, and mapping information. FIG. 8 and a grouping process described below will be described based on grouping for each channel. However, the grouping for each channel in the embodiment of the present invention is only an embodiment of the grouping but the scope of the present invention is not limited thereto. The channel may refer to a transmission path or a communication path through which the WLAN AP and the terminal communicate in the embodiment of the present invention. For example, the channel may correspond to a range of frequencies operated by the WLAN AP and may include uplink frequency bands and downlink frequency bands of the WLAN AP and the terminal.

The beacon transmission period refers to a period on which the WLAN AP periodically transmits the beacon. For example, the WLAN AP having a beacon transmission period of 100 ms periodically transmits a beacon signal in every 100 ms. The BS may group WLAN APs using the same channel according to a proper value of the beacon transmission time through mapping. When a beacon transmission time of a particular WLAN AP corresponds to each group time divided from the beacon transmission time according to a grouping level, the BS may map the corresponding group to indicate that there is a WLAN AP transmitting the beacon in the corresponding group. Accordingly, the mapping to the particular group means that one or more WLAN APs transmit the beacon signal at the corresponding group time. In an embodiment of the present invention, through the above method, the BS may group the transmission time of the WLAN APs for each beacon transmission time and transmit the grouped transmission time to the terminal.

The beacon signal may be a beacon frame. The grouping level may be a time unit dividing the beacon transmission period. The grouping level may be a unit time configured by the BS. Further, the grouping level may be changed according to the purpose. For example, the grouping level may be the same as the beacon transmission period. In this case, the beacon transmission period may be expressed by one group. In another embodiment, the beacon transmission period may be 100 ms and the grouping level may be 1 ms. In this case, the beacon transmission period may be divided into 100 groups. As described above, the grouping level may vary depending on a configuration by the BS. When the grouping level is changed, the number of groups may be changed. However, the grouping level should be configured by a unit larger than an error of synchronization time between the terminal and the BS. The synchronization time may refer to a reference time configured to the WLAN AP, a reference time of the terminal, or a reference time of the BS. Further, the synchronization time may refer to an error of a reference time between entities.

When the number of groups becomes larger according to the grouping level, an amount of information increases, but the terminal having received the information discovers WLANs while turning on or turning off a WLAN interface at the more accurate time, so that an energy reduction effect may be greater. In contrast, when the beacon transmission period and the grouping level are the same, the number of groups is one, so that an amount of information to be transmitted is reduced. However, the WLAN interface is always turned on within each channel during the beacon transmission period and there is little energy reduction effect.

Referring to FIG. 9, the beacon information transmission time of the WLAN AP is mapped for each channel. It is assumed that beacon transmission periods of respective channels are the same in an embodiment of FIG. 9. It is assumed that the beacon transmission period is 100 ms and the grouping level is 1 ms. Further, there are 100 groups having group numbers from 0 to 99. It is assumed that a reference time is 12:00:00.

The BS may receive information on the beacon transmission period and the beacon transmission time when receiving beacon information from the terminal or the WLAN AP. Accordingly, the BS may recognize the beacon transmission time and the beacon transmission period of each WLAN AP with respect to the reference time by comparing the beacon information reception time with the reference time.

Meanwhile, whether the information of the WLAN AP received from the terminal or the WLAN AP or the time information included in the beacon information is effective in the BS may be a problem. The time information between the terminal and the BS may be synchronized by a common device such as a Global Positioning System (GPS). The terminal or the WLAN AP does not use the GPS. In this case, when the terminal initially accesses the BS or performs a handover, the terminal may receive time information from the BS and synchronize the time with the BS in a more accurate unit (unit)) as compared to a grouping level (ms unit) through a correction of a propagation delay.

In an embodiment of FIG. 9, a zeroth group, a first group, a second group, a third group, a ninety eighth group, and a ninety ninth group are mapped to a first channel. The mapping of the zeroth group means that there is the WLAN AP transmitting the beacon between 0 and 1 ms based on the reference time 12:00:00. The mapping of the first group means that there is the WLAN AP transmitting the beacon between 1 and 2 ms based on the reference time 12:00:00. The mapping of the ninety ninth group means that there is the WLAN AP transmitting the beacon between 99 and 100 ms based on the reference time 12:00:00. The mapped group means that there is at least one group transmitting the beacon in the time corresponding to the group from the reference time. Accordingly, it is noted that there is at least one WLAN AP transmitting the beacon in each time corresponding to each of the zeroth group, the first group, the second group, the third group, the ninety eighth group, and the ninety ninth group in the first channel.

Similarly, an eighth group and a ninth group are mapped to a second channel. Accordingly, it is noted that there is at least one WLAN AP transmitting the beacon in each time corresponding to each of the eighth group and the ninth group in the second channel.

Further, the second group, the third group, a seventy ninth group, and an eightieth group are mapped to an Nth channel. Accordingly, it is noted that there is at least one WLAN AP transmitting the beacon in each time corresponding to each of the second group, the third group, the seventy ninth group, and the eightieth group in the Nth channel.

In the above described way, the grouping may be performed in N channels. When information grouped through the above method is transmitted to the terminal, the terminal may receive the information and turn on a WLAN interface only during the time corresponding to a mapped group, so as to discover adjacent WLAN APs. Accordingly, it is possible to efficiently discover the WLAN.

Subsequently, an embodiment in which the BS generates index information in the embodiment of FIG. 9 will be described with reference to FIGS. 10A to 10E. FIGS. 10A to 10C illustrate an embodiment of index information including a time when a WLAN interface is turned on. FIGS. 10D to 10E illustrate an embodiment of index information including a time when a WLAN interface is turned off.

In FIG. 9, the BS may process the received information to generate the grouping information. Further, the BS may change the grouping information to index information illustrated in FIGS. 10A to 10E and transmit the index information to the terminal. The grouping information or the index information may include the time when the terminal having received information turns on or off the WLAN interface from the reference time. Further, the grouping information or the index information may include a beacon period, a grouping level, and channel information.

Referring to FIG. 10A, the index information is information of the WLAN AP having the reference time 12:00:00 and a beacon transmission period 100 ms and includes a group level 1 ms. Further, the index information includes a command for turning on the WLAN interface in the 0, 1, 2, 3, 98, and 99 groups in the first channel since there is the WLAN AP transmitting the beacon in the 0, 1, 2, 3, 98, and 99 groups in the first channel, turning on the WLAN interface in the 8 and 9 groups in the second channel, and turning on the WLAN interface in the 2, 3, 79, and 80 groups in the third channel. Meanwhile, in FIG. 10A, the number of indexes of each channel follows the order of first channel>third channel>second channel. The BS may determine a channel discovery order based on the number of indexes. In the embodiment of the present invention, it is advantageous to first discover a channel having the larger number of channel indexes. The index information may include channel search order information. The UE receiving the index information can reduce WLAN discovery time and energy by performing the WLAN discovery from the channel having the largest number of indexes. That is, the terminal may perform the channel discovery based on the channel discovery order received from the BS. Further, the terminal may determine the channel discovery order based on information on the number of indexes received from the BS.

FIG. 10B illustrates another embodiment including index information. In FIG. 10B, the index information includes information on a beacon period and a grouping level. Further, the index information may further include the time when the WLAN is discovered by turning on the WLAN interface for each channel.

FIG. 10B illustrates another embodiment including index information. Referring to FIG. 10C, the index information includes information on the reference time and a beacon transmission period. Further, the index information may further include the time when the WLAN is discovered by turning on the WLAN interface for each channel.

FIG. 10D illustrates an embodiment of index information including WLAN interface turn off information. In FIG. 10D, the index information includes information on the reference time, a beacon transmission period, and a grouping level. Further, the index information may further include information on the time when the WLAN interface is turned on based on the reference time and group information.

FIG. 10E illustrates another embodiment of index information including WLAN interface turn off information. In FIG. 10E, the index information includes the reference time and a beacon transmission period. Further, the index information may further include information on the time when the WLAN interface is turned off based on the reference time for each channel.

A method of configuring the index information according to the embodiment of the present invention has been described with reference to FIGS. 10A to 10E. However, the method of configuring the index information described through FIGS. 10A to 10E is only an embodiment, and the scope of the present invention is not limited thereto.

Meanwhile, the grouping method described above is performed using the beacon information which the BS receives from the terminal or the WLAN AP. However, the BS may receive processed information from the terminal or the WLAN AP. When the terminal or the WLAN AP receives a beacon information request message of the WLAN AP from the BS, the terminal or the WLAN AP may transmit information on a beacon transmission time based on the time when the message is received from the BS. The BS may perform the grouping in accordance with the beacon transmission information based on the reference time received from one or more terminals or WLAN APs.

FIG. 11 is a flowchart illustrating a method of discovering a WLAN by the terminal according to an embodiment of the present invention.

In step S1101, the terminal may receive grouping information from the BS. The grouping information may be index information. The grouping information may include information on the time when the terminal should turn off the WLAN interface.

In step S1103, the terminal may perform the WLAN discovery according to the received grouping information. The terminal may turn on the WLAN interface only during the time when the terminal should turn on the WLAN interface and discover the WLAN AP within a range. Since the terminal discovers the WLAN AP only during the time corresponding to the received information, energy consumption used for the WLAN AP discovery can be reduced.

The terminal may turn on or off the WLAN interface and discover the WLAN according to the received information. Further, the terminal may discover a channel according to a preset order or perform the WLAN discovery while changing the channel.

Subsequently, a method of efficiently discovering a channel will be described with reference to FIG. 12. FIG. 12 is a flowchart illustrating a method of discovering each channel according to an embodiment of the present invention.

In step S1201, the terminal may compare numbers of indexes for respective channels by using information received from the BS. The number of indexes for each channel may refer to the number of mapped groups. When all channels generate grouping information with the same beacon transmission period and the same grouping level, a channel having the largest number of indexes may be a channel having the largest number of mappings and a channel having the longest WLAN discovery time through the turned on WLAN interface by the terminal. The terminal may compare the numbers of indexes for respective channels in the received information and arrange the channels, starting from a channel having the largest number of indexes.

In step S1203, the terminal may perform the WLAN discovery of each channel according to the arranged order. Through the above method, the terminal may perform the WLAN discovery from the channel having the largest number of indexes. Accordingly, the terminal may discover the WLAN AP more quickly. That is, the WLAN AP discovery time can be reduced.

Meanwhile, in the description of FIG. 12, the terminal discovers the channel based on the WLAN AP information received from the BS. More specifically, it has been described that the terminal arranges priorities of channels to be discovered according to the number of indexes based on the received information. However, when the BS transmits information of the WLAN AP, the BS may arrange in advance channel discovery orders based on the number of indexes for each channel and then transmit the information of the WLAN AP. In this case, the terminal is not required to arrange channels by itself and may discover the WLAN AP in the channel discover order determined by the BS by turning on the WLAN interface at a mapping time point of each channel received from the BS.

FIG. 13 is a view describing the methods of FIGS. 11 and 12.

A process in which the terminal processes the grouping information of FIG. 9 will be described. When the terminal receives the information of FIG. 9, the terminal may discover channels according to an order of first channel>Nth channel>second channel since the number of indexes of the Nth channel is larger than the number of indexes of the second channel. The terminal may arrange the channels from the channel having the largest number of indexes based on the number of indexes. In FIG. 13, the terminal may arrange grouping information according to the order of the first channel, the Nth channel, and the second channel. The terminal may discover the WLAN of each channel by turning the WLAN interface only at a mapped time point of each channel according to the arranged grouping information. The terminal may turn off the WLAN interface at a time point when the group is not mapped in each channel.

Subsequently, an operation for changing a channel and discovering a WLAN according to an embodiment of the present invention will be described with reference to FIG. 14.

FIG. 13 describes a method of performing the WLAN discovery for each channel. However, the embodiment of the present invention is not limited thereto. The terminal may discover another channel before completing a discovery of one channel and perform the previous channel discovery again. That is, referring to FIG. 13, pieces of group index information of the first channel and the Nth channel do not overlap each other. Accordingly, by discovering a WLAN of another channel while changing a channel during the time when the pieces of information do not overlap, the channel discovery time can be reduced. That is, in the embodiment of FIG. 14, since the WLAN discovery can be performed while the channel is changed at the time when a mapping relation between different channels does not overlap, the WLAN discovery time of total channels can be reduced.

The UE may receive index information of each channel from the BS. The terminal may re-arrange a mapping relation of each channel based on the index information. A process of re-arranging the mapping relation makes a configuration such that mapping resources of respective channels do not overlap in the same time area. When there are resources overlapping in the same time area, beacon transmission periods corresponding to the number of overlapping resources are added and one of the overlapping resources may be mapped to a time area of the added beacon transmission period. For example, all channels do have overlapping resources, all index resources may be mapped on one beacon transmission period time axis. However, when one resource for two channels overlap on the same time axis, the resource for one channel is mapped to the beacon transmission period time axis and the overlapping resource may be mapped to the added beacon transmission time axis.

Referring to FIG. 14, a WLAN can be discovered by discovering zeroth to third groups of the first channel, turning off a WLAN interface, changing a discovery channel to the Nth channel in eighth to ninth groups, and turning on the WLAN interface, and the WLAN interface can be discovered by making the change to the first channel again in ninety eighth to ninety ninth groups. Through the above method, when pieces of mapping information for respective channels do not overlap, the channels can be switched and the WLAN discovery can be performed.

Meanwhile, in FIG. 14, although it has been described that the terminal collects the index information of the channel from the BS and re-arranges channel mapping relations based on the index information, an embodiment of the present invention is not limited thereto. The BS may re-arrange the channel mapping relations based on the index information for each channel and then transmit the re-arranged channel mapping relations to each UE. In this case, the UE having received the re-arranged channel mapping relations may perform the WLAN discovery based on the received information.

A case where beacon transmission periods are the same has been described as an example in the above. An embodiment of the present invention may be applied to a case where the beacon transmission periods are different. In the following description, operations of the BS and the terminal when beacon transmission periods are different will be described with reference to FIGS. 15 and 16.

FIG. 15 is a view describing a method of generating grouping information when beacon transmission periods are different according to an embodiment of the present invention and FIG. 16 is a view describing synchronization between channels having different beacon transmission periods.

Referring to FIG. 15, pieces of beacon transmission information of AP1 and AP2 are mapped. A beacon transmission period of WLAN AP1 is 100 ms and a beacon transmission period of WLAN AP2 is 150 ms. Each of grouping levels is 1 ms. WLAN AP1 transmits beacon information in group 0 timing and WLAN AP2 transmits beacon information in group 3 timing. However, since the beacon transmission periods of WLAN AP1 and WLAN AP2 are different, the BS required to generate grouping information may have a synchronization problem.

In this case, the BS may generate grouping information and index information according to a larger period. Accordingly, it may be assumed that the beacon transmission period of WLAN AP1 is 150 ms and mapping may be additionally made to group 100 as well as group 0. In this case, the beacon transmission periods of WLAN AP1 and WLAN AP 2 may be synchronized into 150 ms. Further, index information and grouping information having the beacon transmission period of 150 ms with respect to the corresponding channel may be generated.

Subsequently, a discovery method of the terminal when beacon transmission periods for respective channels are different will be described with reference to FIG. 16. Referring to FIG. 16, beacon transmission periods of first and second channels are 100 ms, but a beacon transmission period of the Nth channel is 150 ms. The terminal may receive information such as index information of FIG. 16 from the BS. In this case, the terminal may recognize that there are channels having different beacon transmission periods.

In FIG. 13, a method of performing a discovery from a WLAN of a channel having the larger number of group indexes will be described as an embodiment. In another embodiment, when channel having different periods are included, a channel having a high grouping density may be first discovered. The grouping density may be defined by the number of mapped groups against entire groups. Based on the arrangement based on the grouping density, the WLAN discovery may be performed in an order of first channel, Nth channel, and second channel.

In each of the channels, as illustrated in FIG. 13, the WLAN interface is turned on in the mapped groups and thus a state where the beacon can be received is maintained, and the WLAN interface is turned off in the non-mapped groups, so as to save energy. Meanwhile, in an embodiment of FIG. 16, the Nth channel having a different beacon transmission period is included. Accordingly, the terminal may discover the Nth channel for 150 ms, stand by for an additional 50 ms for more synchronization of the following channel, and then go on to the second channel having a beacon transmission period of 100 ms. During the standby time for the synchronization, the WLAN interface may remain in an off state to save energy.

In the above description, when the terminal receives the grouping information or index information and there is a channel having a different beacon transmission period, an operation for the synchronization has been performed. The UE may recognize and also perform the synchronization in the discovery process and the BS transmitting grouping information or index information may recognize that there is a channel having a different beacon transmission period in a plurality of channels and first map and transmit a standby time for the synchronization.

Although specific embodiments of the present invention have been described above, it will be apparent to those skilled in the art that the scope of the present invention is not limited to the above-described embodiments, and various modifications and modified forms may be made using the basic concept of the present invention without departing from the scope of the present invention.

The invention claimed is:

1. A method of transmitting a signal to perform a wireless local area network (WLAN) discovery by a base station (BS), the method comprising:
    identifying information including a first beacon transmission period, a first beacon transmission time of a first WLAN access point (AP), a second beacon transmission period, and a second beacon transmission time of a second WLAN AP within a cell range of the BS;
    determining the first beacon transmission period as a reference transmission period used for synchronizing each beacon transmission period of the first WLAN AP and the second WLAN AP based on the identified information, if the first beacon transmission period is longer than the second beacon transmission period;
    determining a plurality of durations by dividing the reference transmission period using a predetermined time unit;
    generating grouping information based on the identified information, including first time information indicating at least one first time duration among the plurality of durations where at least one of the first and the second WLAN APs transmits beacons and second time information indicating at least one second time duration among the plurality of durations where the first and the second WLAN APs do not transmit beacons based on the reference transmission period; and
    transmitting the grouping information to at least one reception terminal within the cell range of the BS.

2. The method of claim 1, wherein the identifying of the information comprises:
    transmitting a message instructing at least one measurement terminal to measure the first beacon transmission period, the second beacon transmission period, the first beacon transmission time and the second beacon transmission time; and
    receiving information on the measured first beacon transmission period, the measured second beacon transmission period, the measured first beacon transmission time and the measured second beacon transmission time from the at least one measurement terminal.

3. The method of claim 1, wherein the identifying of the information comprises receiving information on the first beacon transmission period, the second beacon transmission period, the first beacon transmission time and the second beacon transmission time from the first and the second WLAN APs connected to the BS wirelessly or through a wire.

4. The method of claim 1, wherein the grouping information comprises channel information of each of the first and the second WLAN APs.

5. The method of claim 4, wherein the first time information includes an index number of the at least one first time duration corresponding to the channel information.

6. The method of claim 1, wherein the grouping information includes channel information on each of the first and the second WLAN APs and channel priority information determined based on a number of the at least one first time duration corresponding to the channel information.

7. A base station (BS) providing wireless local area network (WLAN) discovery information, the BS comprising:
a transceiver for communicating with a terminal and at least one WLAN access point (AP); and
at least one processor configured to:
identify information including a first beacon transmission period, a first beacon transmission time of a first WLAN AP, a second beacon transmission period, and a second beacon transmission time of a second WLAN AP within a cell range of the BS,
determine the first beacon transmission period as a reference transmission period used for synchronizing the first beacon transmission period with the beacon transmission period based on the identified information, if the first beacon transmission period is longer than the second beacon transmission period,
determine a plurality of durations by dividing the reference transmission period using a predetermined time unit,
generate grouping information based on the identified information, including first time information indicating at least one first time duration among the plurality of durations where at least one of the first and the second WLAN APs transmits beacons, and second time information indicating at least one second time duration among the plurality of durations, where the first and the second WLAN APs do not transmit beacons based on the reference transmission period, and
transmit the grouping information to at least one reception terminal within the cell range of the BS.

8. The BS of claim 7, wherein the at least one processor is further configured to:
transmit a message instructing at least one measurement terminal to measure the first beacon transmission period, the second beacon transmission period, the first beacon transmission time, and the second beacon transmission time, and
receive information on the measured first beacon transmission period, the measured second beacon transmission period, the measured first beacon transmission time and the measured second beacon transmission time from the at least one measurement terminal.

9. The BS of claim 7, wherein the at least one processor is further configured to receive information on the first beacon transmission period, the second beacon transmission period, the first beacon transmission time and the second beacon transmission time from the first and the second WLAN APs connected to the BS wirelessly or through a wire.

10. The BS of claim 7, wherein the grouping information comprises channel information of each of the first and the second WLAN APs.

11. The BS of claim 10, wherein the first time information includes an index number of the at least one first time duration corresponding to the channel information.

12. A method of discovering a wireless local area network (WLAN) by a terminal, the method comprising:
receiving, from a base station (BS), grouping information including first time information indicating at least one first time duration among a plurality of durations, divided from a reference transmission period using a predetermined time unit, where at least one of a first WLAN access point (AP) and a second WLAN AP transmits beacons, and second time information indicating at least one second time duration among the plurality of durations where the first and the second WLAN APs do not transmit beacons, wherein the reference transmission period is used for synchronizing a first beacon transmission period of the first WLAN AP with a second beacon transmission period of the second WLAN AP; and
searching the at least one WLAN AP only in the at least one first time duration based on the grouping information,
wherein the reference transmission period is determined by the first beacon transmission period by the BS, if the first beacon transmission period is longer than the second beacon transmission period, and
wherein the grouping information is generated by the BS based on the reference transmission period and the plurality of durations.

13. The method of claim 12,
wherein the first time information comprises an index number of the at least one first time duration corresponding to channel information of each of the first and the second WLAN APs, and
wherein the searching of the at least one WLAN AP comprises sequentially searching channels from a channel having a largest number of indexes of the at least one first time duration based on the channel information.

14. The method of claim 13, wherein the searching of the at least one WLAN AP comprises:
searching a WLAN of a particular channel during first time corresponding to the particular channel in the at least one first time duration;
switching to another channel based on the channel information; and
searching a WLAN of the switched channel during second time corresponding to the switched channel in the at least one first time duration.

15. The method of claim 12, wherein the at least one second time duration comprises a dummy duration for determining the reference transmission period.

16. The method of claim 12, further comprising:
receiving a message instructing to measure beacon transmission information of the first and the second WLAN APs from the BS; and
transmitting, to the BS, beacon transmission information on the first and the second WLAN APs within a WLAN interface range of the terminal based on the received message.

17. The method of claim 12, wherein the searching of the at least one WLAN AP comprises searching a corresponding channel by turning on a WLAN interface in the at least one first time duration.

18. A terminal discovering a wireless local area network (WLAN), the terminal comprising:
a transceiver for communicating with a base station (BS) and at least one WLAN access point (AP) including a first WLAN AP and a second WLAN AP; and
at least one processor configured to:
receive, from the BS, grouping information including first time information indicating at least one first time duration among a plurality of durations, divided from a reference transmission period using a predetermined time unit, where at least one of the first WLAN AP and the second WLAN AP transmits beacons, and second time information indicating at least one second time duration among the plurality of durations where the first and the second WLAN APs do not transmit beacons, wherein the reference transmission period is used for synchronizing a first beacon transmission period of a first WLAN AP with a second beacon transmission period of a second WLAN AP, and search the at least one WLAN AP only in the at least one first time duration based on the grouping information, wherein the reference transmission period is determined by the first beacon transmission period by the BS, if the first beacon transmission period is longer than the second beacon transmission period, and wherein the grouping information is generated by the BS based on the reference transmission period and the plurality of durations.

19. The terminal of claim 18, wherein the first time information comprises an index number of the at least one first time duration corresponding to channel information of each of the first and the second WLAN APs, and wherein the at least one processor is further configured to sequentially search channels from a channel having a largest number of indexes of the at least one first time duration based on the channel information.

20. The terminal of claim 19, wherein the at least one processor is further configured to:

search a WLAN AP of a particular channel during first time corresponding to the particular channel in the at least one first time duration, switch to another channel based on the channel information, and search a WLAN AP of the switched channel during second time corresponding to the switched channel in the at least one first time duration.

21. The terminal of claim 18, wherein the at least one second time duration comprises a dummy duration for determining the reference transmission period.

22. The terminal of claim 18, wherein the at least one processor is further configured to:

receive a message instructing to measure beacon transmission information of the first and the second WLAN APs from the BS, and transmit, to the BS, beacon transmission information on the first and the second WLAN APs within a WLAN interface range of the terminal based on the received message.

* * * * *